Figures 1, 2:
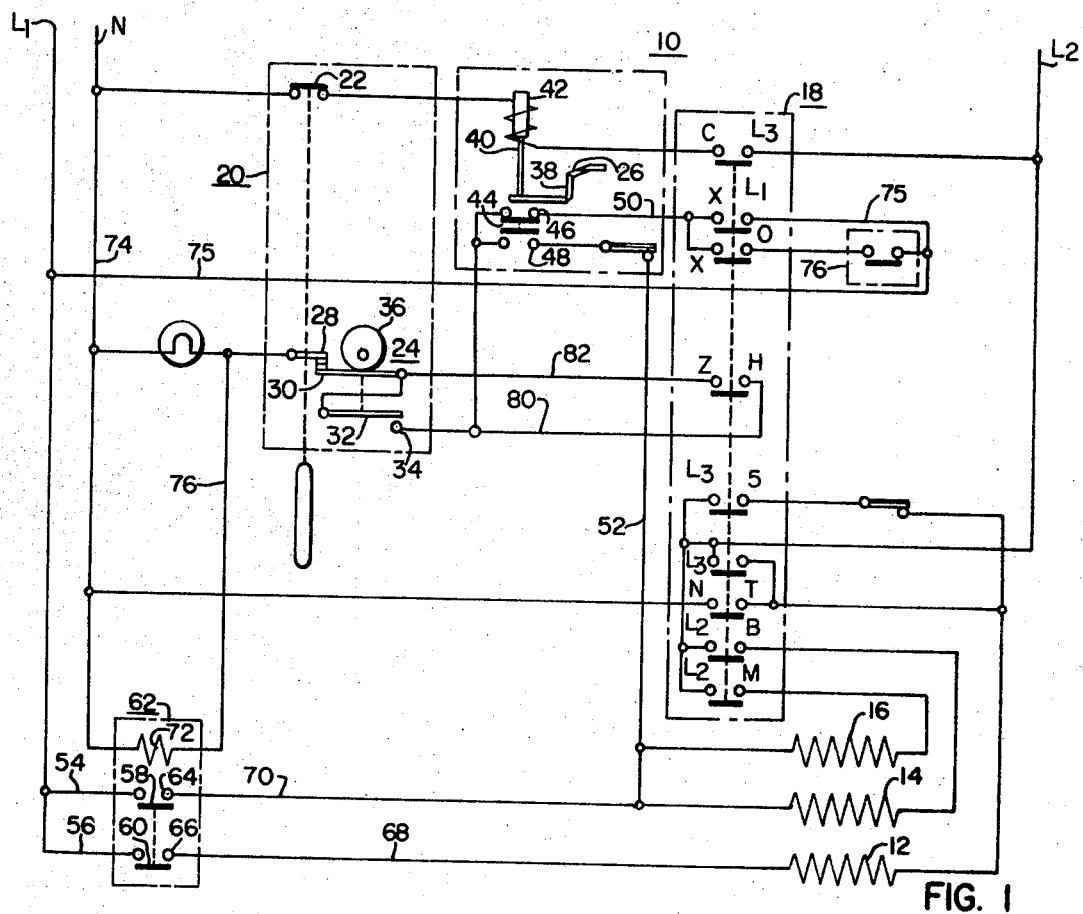

United States Patent
Holtkamp

[15] 3,655,943
[45] Apr. 11, 1972

[54] SINGLE POLARITY OVEN CONTROL

[72] Inventor: Calvin J. Holtkamp, Mansfield, Ohio

[73] Assignee: Westinghouse Electric Corporation, Pittsburgh, Pa.

[22] Filed: Apr. 15, 1970

[21] Appl. No.: 28,677

[52] U.S. Cl. ..................................................219/491
[51] Int. Cl. ..................................................H05b 1/02
[58] Field of Search..............219/412, 491, 492, 413, 397

[56] References Cited

UNITED STATES PATENTS 3,122,626  2/1964  Welch..............................219/413 X
3,072,773  1/1963  Clapp..............................219/512 X Primary Examiner—Bernard A. Gilheany
Assistant Examiner—F. E. Bell
Attorney—F. H. Henson, E. C. Arenz and R. B. Farley

[57] ABSTRACT

An oven system having a heat clean cycle is disclosed that utilizes a single peak circuit having a single polarity thermal power relay. An oven thermostat is used to provide the required dialed in temperature for heat cleaning and this thermostat includes a cam arrangement actuating a movable contact which is closed for normal cooking temperatures and which is open for oven cleaning purposes. The contact is shunted in latch and clean modes to insure that the multi-terminal selector switch is set for proper oven circuitry whenever the thermostat is set for an upper temperature limit. The single polarity thermal relay is connected in series circuit relationship to the oven heaters for broil, fast broil and bake and opens upon attainment of the temperature peak utilized for cleaning purposes.

4 Claims, 2 Drawing Figures

| | $L_1$ $X$ | $X$ $O$ | $L_3$ $C$ | $L_3$ $S$ | $L_3$ $T$ | $T$ $N$ | $H$ $Z$ | $B$ $L_2$ | $L_2$ $M$ |
|---|---|---|---|---|---|---|---|---|---|
| OFF | | | | | | | | | |
| BAKE | X | | | | | X | | X | |
| T. BAKE | | X | | | | | | X | |
| LATCH | X | | X | | | | X | | |
| CLEAN | | | | X | | | X | | |
| BROIL | X | | | | X | | | | |
| BROIL(A) | X | | | | X | | | | X |

INVENTOR
Calvin J. Holtkamp

ATTORNEY

3,655,943

SINGLE POLARITY OVEN CONTROL

BACKGROUND OF THE INVENTION

1. Field of the Invention

This invention relates to the art of heat cleaning ovens and the control means therefor and, more specifically, relate to a heat cleaning oven utilizing a single peak circuit having a single polarity relay arrangement.

2. Description of the Prior Art

It is known in the heat cleaning art to provide an oven with a control arrangement in which the oven is heated up to a predetermined temperature in a cleaning temperature range and heating is then stopped, such arrangements being shown as old for example, in U.S. Pat. No. 3,116,398 and 3,121,158. In a single peak heating cycle oven, the oven heating means is not cycled to produce an average temperature of the oven at which the thermostat is set for an extended period of time, rather the oven heating means is energized only so long as it takes to reach the setting of the thermostat and heating is then terminated.

Another example of a single peak heat cleaning arrangement is disclosed in U.S. Pat. application 773,539 filed Nov. 5, 1968 now U.S. Pat. No. 3,549,862, and owned by a common assignee and in which a pair of thermal power relays are utilized to provide power to the oven until a temperature peak of approximately 1,000° F. is obtained. At this temperature a clean thermostat opens, causing the thermal power relay means to open, turning off the power to the oven heater and causing the oven to cool. Subsequent reclosing of the thermostat, upon cooling does not reclose the oven heating circuit because the thermal power relay means remains open. In this arrangement, two relatively expensive thermal power relays are required. An analysis of the circuitry of the aforesaid application discloses that it is impossible to substitute a single polarity thermal power relay and obtain a significant savings therefrom without a major modification to the oven circuitry, including providing a delayed action transfer switch. Other modes of utilization of a single polarity thermal relay such as modifying the selector switch might permit the use of this type of thermal power relay but manufacturing economics do not justify modification of the selector switch by the addition of more contacts so that another solution to the problem must be made. Accordingly, it would be advantageous to provide a single peak oven control circuitry which could advantageously and inexpensively utilize a single polarity relay in a self-cleaning oven cycle arrangement.

SUMMARY OF THE INVENTION

In accordance with the invention, a heat cleaning oven system is provided which utilizes a single temperature peak to provide cleaning of the oven cavity. A single polarity thermal power relay having dual movable contacts or poles is provided in a circuit which actuates the bake, broil and quick broil elements of the oven system, with these three elements connected in a parallel circuit relationship to a selector switch which is substantially conventional. An oven thermostat consisting of a movable dial and a requisite thermal responsive element of a conventional hydraulic or pneumatic type is continuously adjustable between 140° F. and 1,100° F. Within this thermostat, the adjustment cam is also provided with a switch blade which operates to open and close a contact in the circuit which is closed for normal cooking temperatures and which is open for cleaning temperatures. This contact is shunted by a pair of leads connected to the thermostat and a pair of contacts in the selector switch that are placed in closed position in the latch and clean modes of operation. Shunting of this contact insures that the selector switch is set for proper oven circuitry when the adjustable thermostat is set for maximum temperature. When the selector switch is set in the baking or broiling modes, the thermal relay is closed, because a circuit is completed from one side of the line through the selector switch, the adjustable thermostat, switch blade contact and through the heater in the thermal power relay to the neutral side of the circuitry. Thermostatic cycling of the thermostat controls the temperature in the oven.

To place the oven in the clean mode of operation requires a stop of the selector switch in the latch position, which sets up circuitry to close the relay contacts and to energize the solenoid buzzer and bypass the thermostat contact. Setting of the thermostat control to clean temperature then recalibrates it for a 1,050° F. operation and insures that the thermostat is closed when the selector switch is turned to the clean mode. Movement of the latch from the latch mode to the locking mode causes a locking solenoid pin to drop to move an interlock switch that transfers power provided from the one side of the circuit from the selector switch to a mid-point between the thermal relay and the quick broil and bake heater elements so that, upon opening of the thermostat at the previously set temperature of 1,055°, the heat cleaning cycle cannot be continued when this thermostat closes due to a temperature drop during the cooling process.

DRAWING DESCRIPTION

For a better understanding of the invention, reference may be had to the preferred embodiment, exemplary of the invention, shown in the accompanying drawings in which:

FIG. 1 is a partly diagrammatic and mainly schematic view of the control and actuating system arrangement for an oven according to the instant invention; and FIG. 2 is a chart which identifies which contacts of the selector switch means are closed for particular settings of this means.

PREFERRED EMBODIMENT OF THE INVENTION

The control and actuating system of the instant invention is indicated generally by the numeral 10 in FIG. 1 and includes a broil heater 12, a bake heater 14 and an auxiliary broil heater 16 located in the oven cavity (not shown), with the auxiliary broil 16 being used in conjunction with a regular broil heater 12 to obtain simultaneous cooking of the opposite faces of a food article such as a meat dish or the like.

An oven selector switch means 18 is settable from an "off" position (FIG. 1) to obtain a selected operation cycle in the modes of bake, broil, auxiliary broil, time bake and latch and clean positions. To enable this switch to provide this variety of functions, it includes a plurality of fixed and movable contacts (indicated by letter in FIG. 1) by which electrical connections may be made to energize various circuits in the control arrangement 10. The 13 external terminals of the selector switch means 18 are identified by letter reference in FIG. 1 which corresponds to the letter reference across the top of the Table of FIG. 2. The indication "X" in the Table denotes those contacts that are in an active engaged electrical carrying capacity.

A thermostat system 20 is shown as a dashed line box with the elements contained within this box being disposed outwardly of the oven cavity so as to provide control for it during its operation. More specifically, the thermostat system 20 includes a door lock thermostat 22 and an adjustable thermostat 24, with the door lock thermostat 22 being provided to open at about 550° F. so as to prevent unlocking of the door latch 26 once the cleaning cycle has been initiated. Thermostat 24 takes the form an adjustable thermostat which may be calibrated between 140° and 1,100° F. so as to provide for bottom and top temperature control within the oven enclosure. This thermostat opens by a switchblade means 28 when the temperature set on the dial on the thermostat (not shown) has been reached. Thermostat switch blade 28 is normally closed against a contact 30 during operation of any heating cycle and opens only upon the set temperature being reached. Thermostat 24 also includes a second switchblade 32 which closes against a contact 34 when urged to this position by a cam 36 movable by the dial (not shown) of the thermostat 34, with this cam also providing for adjustment of the temperature setting of the thermostat 24 in a well known manner. Cam 36 operates to close switchblade 32 against contact 34 in the normal cooking cycles of the oven, i.e., bake, time bake, broil and quick broil and operates to move switchblade 32 away from contact 34 to open the switchblade 32 in the operation of the oven system 10 in the clean mode.

The arrangement by which the latching occurs and places the oven door and oven system 10 in a condition for locking may be of the same general character as disclosed in Nagel U.S. Pat. No. 3,387,874, issued June 11, 1968 and owned by a common assignee. As is disclosed in that patent, an oven door (not shown) carries a latch handle (not shown) that includes a latching bolt (not shown) which is turned up out of the top edge of the door after the door is closed. The bolt rotates a bell crank (not shown) to transmit a forward pull through a link to one end of a lock bar 38 (FIG. 1); the lock bar pivots to move a portion of the lock bar 38 underlying a locking pin 40 out the way of this pin so that the pin can drop when a solenoid 42 or other electro-responsive means is deenergized. When the pin 42 drops it blocks return movement of the locking bar 38 and also moves a transfer or interlock switch 44 from one position to another; thus the switch 44 is interlocked with the operation of the latching mechanism of the oven system 10. It should be noted that the switch 44 is in an upper position (not engaged by the locking pin 40) for all cooking positions of the oven and that the said switch is in its lower position only for the clean position of the oven.

The interlock switch 44 is engageable alternately, with a pair of contacts 46 or 48 with the contact 46 electrically connected to the selector switch 18. The contact 48, in turn, is connected to a lead 52 that extends to the $L_1$ side of the circuit to form part of the holding circuit in a clean operation.

The $L_1$ side of the circuit leads into the oven system 10 by means of a pair of lines 54 and 56 which are in electrical connection with relay switches 58 and 60 that are present in a single polarity thermal power relay 62. A pair of contacts 64 and 66, within the thermal power relay 62, provide for electrical abutting contact with the switches 58 and 60, respectively, when the thermal power relay 62 is activated. These contacts, in turn, are connected to a pair of leads 68 and 70 which extend to the heating elements disposed within the oven cavity (not shown). More specifically, lead 70 extends to and is in electrical connection with the bake element 14 and the quick broil element 16, with these two elements arranged in parallel relationship to each other. Lead 68 extends to the only other heating element within the oven enclosure (not shown), with this element being broil element 12.

Actuating current for the thermal power relay 62 is provided to a resistance 72 of the thermal power relay that serves as the heating element within the thermal power relay 62 so as to activate relay switches 58 and 60 to their closed position. This resistance is disposed electrically in a circuit between a lead 74 extending to neutral N and a lead 76 extending to the adjustable thermostat 24. Current flow to the thermostat 24 in the cooking modes of the oven is then supplied from $L_1$ to neutral N via the contacts $L_1$, and X of the selector switch 18, either directly through a lead 75 to the $L_1$ side of the current supply or through a timing clock 76 which is provided for the time baking cycle.

As is conventional in this type of oven system, the aforementioned door lock thermostat 22 is provided in series relationship with the N side of the electrical supply network, with this thermostat being calibrated to open at above 500° to thereby prevent the opening of the oven door (not shown) while the oven system 10 is in the clean mode of operation.

As was previously set out, the cam 36 permits the switchblade 32 to move to a non-contacting position with the contact 34 when the oven system is in the clean mode and, at the same time, the interlock switch 44 moves to engage the contact 48 out of engagement with the contact 46 through the urging of lock pin 40. In order to provide an arrangement to maintain power flow to the broil element during the cleaning mode, a bypass circuit 78 around switchblade 32 comprising a pair of leads 80 and 82 shorts out the switchblade 32 because the contacts H and Z of the selector switch 18 are closed in the clean mode of oven operation. Thus, a bypass means around the switchblade 32 is provided by the circuit 78. The resistance element 72 is, therefore, connected between neutral N and the $L_1$ side of the line through the lead 52 extending to and in electrical connection with the lead 70 on the $L_1$ side thereby placing $L_1$ potential intermediate the selector switch 18 and the adjustable thermostat 24. The thermal power relay 62 is then still actuated since power in the resistance element 72 maintains the switches 58 and 60 in a closed position. The broil element 12 is also connected across the $L_1$ and $L_2$ lines at this time by means of the lead 68 and the closed contacts $L_3$ and S.

The thermostat 20 and relay 62 are commercially available as King-Seeley catalog part 64031.

Heating during the cleaning cycle continues until the clean temperature of, say, 1,050° F., set by thermostat 24 has been reached, at which time switchblade 28 opens and moves away from contact 30 thereby interrupting the cross-connection of the resistance heat element 72 between neutral N and $L_1$. After a short delay for the resistance heater element 72 to cool somewhat (approximately 2–20 seconds) the switches 58 and 60 of the thermal relay 62 open, removing heat from the broil element 12 to thereby terminate the clean cycle. Subsequent reclosure of thermostat 24 upon the cooling of the oven and closure does not reactivate the thermostat resistance heater 72 since the switches 58 and 60 are not open so that there is no cross-connection between $L_1$, $L_2$ and N to the resistance heater 72.

It should be clear from the foregoing to one skilled in the art that, although only a single embodiment has been specifically described, many modifications could be made therein without the exercise of inventive faculty.

I claim as my invention:

1. The combination of a self-cleaning oven thermostat system of the type having an adjustable temperature range including a cooking temperature range and a heat cleaning temperature range, and including adjustable means for establishing a temperature setting at which oven temperature responsive means is to effect opening of a first switch for controlling energization of a relay having an actuating portion and a single polarity, double-pole switch portion, said adjustable means also closing a second switch when adjusted to said cooking temperature range, and opening said second switch when adjusted to said cleaning temperature range, with a circuit arrangement incorporating said thermostat system, said circuit arrangement including:

oven operation selector means, including a plurality of switch means, operable to a clean position;

a three-wire source of electrical power including opposite sides of line voltage and a neutral connected to selective ones of said switch means of said selector means;

circuit means connecting one of said line voltage sides to the common side of said relay switch portion;

a single-pole, double-throw switch having one position for a cooking operation and an opposite position for a cleaning operation;

circuit means connecting one of the contacts of said double-throw switch to said switch means of said selector means for connection to said one side of said line voltage through said selector means;

circuit means connecting the other of said contacts of said double-throw switch to said same one side of said line voltage through said relay switch portion when said relay switch portion is closed, so that a voltage transfer between said opposite sides of said line is precluded when said double-throw switch is operated;

circuit means connecting the common terminal of said double-throw switch to neutral through said first and second switches of said thermostat and said actuating portion of said relay; and circuit means, including switch means of said selector means having a closed position in a cleaning operation for shunting said second switch in said thermostat.

2. A cooking and single peak heat cleaning oven circuit means including;
a. an adjustable thermostat including a first switch means movable to an open position upon reaching an upper cutoff temperature in heat cleaning range,
b. a single polarity relay means having its energization means in series with said first switch means and connected to neutral,
c. a second switch means disposed in series relationship with said first switch means of said adjustable thermostat and operative to open condition by an actuating means when said adjustable thermostat is adjusted to said cutoff temperature in heat cleaning range,
d. a selector switch means including contact means,
e. a first circuit means connecting first of said contact means to said second switch means,
f. an electric supply means and circuit means for supplying power to said selector switch means,
g. said first switch means connected to a second circuit means, said second circuit means connected to other contact means of said selector switch means,
h. said energization means of said single polarity relay means being energized through said first switch means, said second switch means, said first circuit means and said first of said contact means for cooking temperature ranges,
i. said energization means of said single polarity relay means being energized through said first switch means, said second circuit means and said other of said contact means of said selector switch means for heat cleaning temperature range,
j. whereby said single polarity relay means remains energized for passage of electrical energy to a heating means for all temperatures up to a heat cleaning cutoff temperature when said first switch opens to terminate heating.

3. The combination set out in claim 1, wherein;
a. said actuating means comprises a cam.

4. The combination set out in claim 1, wherein:
a. said second circuit includes a door interlock switch means.

* * * * *